United States Patent [19]

Keown

[11] Patent Number: 4,685,658

[45] Date of Patent: Aug. 11, 1987

[54] SPRING ELEMENT

[76] Inventor: Jack B. Keown, CH-5400, Baden, Switzerland

[21] Appl. No.: 796,490

[22] PCT Filed: Oct. 15, 1982

[86] PCT No.: PCT/CH82/00112

§ 371 Date: Jun. 17, 1983

§ 102(e) Date: Jun. 17, 1983

[87] PCT Pub. No.: WO83/01495

PCT Pub. Date: Apr. 28, 1983

Related U.S. Application Data

[63] Continuation of Ser. No. 518,792, Jun. 17, 1983, abandoned.

[30] Foreign Application Priority Data

Oct. 19, 1981 [CH] Switzerland .................. 6671/81

[51] Int. Cl.⁴ .................. F16F 15/00; F16F 1/18; A47C 23/00; E02B 3/22
[52] U.S. Cl. .................. 267/80; 5/236 R; 5/242; 267/103; 267/160
[58] Field of Search .................. 267/80, 83, 103, 104, 267/105, 158, 160, 161, 182, 136, 154, 157; 5/241, 242, 236 R, 237, 239; 248/630, 626; 160/130, 354, 379

[56] References Cited

U.S. PATENT DOCUMENTS

| 212,009 | 2/1879 | Iske | 5/237 |
|---|---|---|---|
| 290,743 | 12/1883 | Burleigm | 5/236 X |
| 2,432,361 | 12/1947 | Winters | 5/239 |
| 2,559,251 | 7/1951 | James | 267/2 |
| 2,892,315 | 6/1959 | Blancato | 405/212 |
| 2,901,703 | 8/1959 | Plunkett | 267/160 X |
| 3,092,424 | 6/1963 | Tiplitz | 267/160 X |
| 3,173,270 | 3/1965 | Blancato | 405/212 |

FOREIGN PATENT DOCUMENTS

| 0359796 | 9/1922 | Fed. Rep. of Germany . | |
| 0743189 | 12/1943 | Fed. Rep. of Germany . | |
| 2821349 | 11/1949 | Fed. Rep. of Germany . | |
| 0491308 | 5/1919 | France . | |
| 0863783 | 10/1939 | France | 5/236 R |
| 1474321 | 3/1967 | France . | |
| 1597690 | 8/1970 | France . | |
| 2070278 | 9/1971 | France . | |
| 2362308 | 3/1978 | France . | |
| 0048889 | 4/1921 | Sweden | 5/237 |
| 0216650 | 12/1941 | Switzerland . | |
| 0434614 | 10/1967 | Switzerland . | |
| 0565723 | 11/1944 | United Kingdom . | |
| 1171276 | 11/1969 | United Kingdom . | |

Primary Examiner—Andres Kashnikov
Assistant Examiner—Robert J. Oberleitner
Attorney, Agent, or Firm—Marmorek, Guttman & Rubenstein

[57] ABSTRACT

A resilient support for receiving a force acting thereon along a certain direction, and wherein the force is opposed by a bearing counterforce acting at least partly along a direction opposite to said certain direction, and which includes a plurality of bar elements, at least two bar elements confronting one another, each of the two confronting bar elements having end regions, and forming a rod pair, a linking bar joining the confronting bar elements at a first set of connecting locations spaced at a distance from any end region of any of the confronting bar elements, two other bar elements, each connecting the end regions off the two confronting bar elements at a second set of connecting locations so as to form a closed structure therewith, the other bar elements forming a bar pair, at least two of the means being resilient in at least one of flexion and torsion, one force acting on a location of at least one of the other bar elements, the other force acting on the linking bar, at least one of the forces acting on a location of one of the bar means which is remote from the connecting location of the one of the linking bar or bar pair with the rod pair.

19 Claims, 13 Drawing Figures

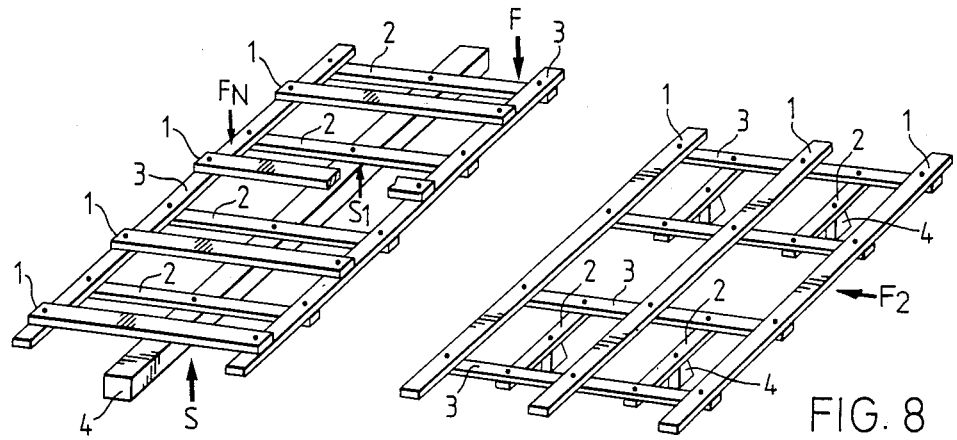
FIG. 7
FIG. 8
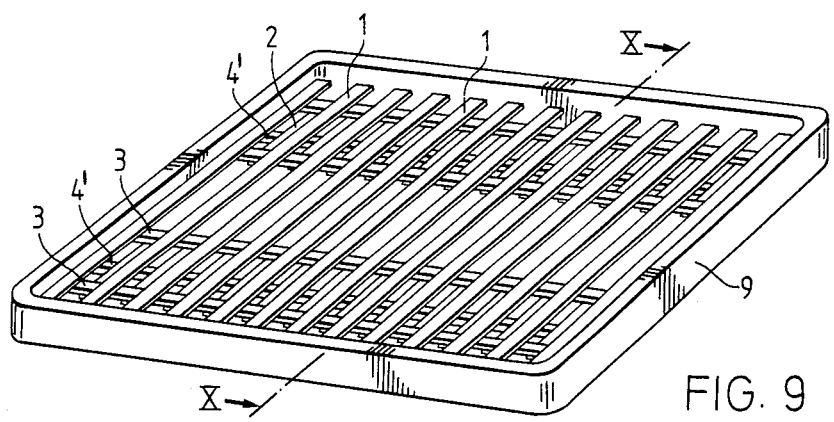
FIG. 9
FIG. 10
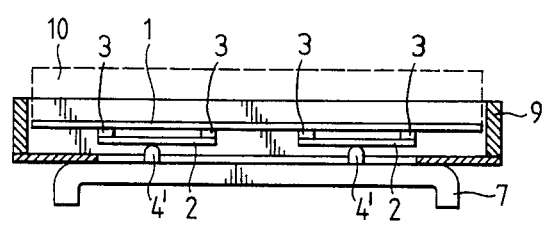
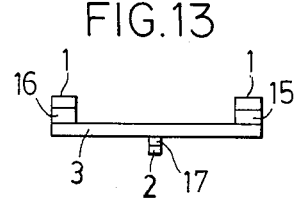
FIG. 13
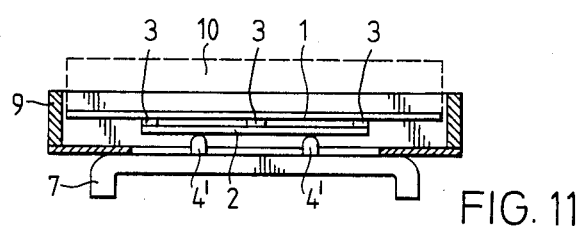
FIG. 11
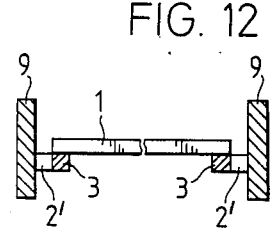
FIG. 12

SPRING ELEMENT

This is a continuation of application Ser. No. 518,792, filed June 17, 1983, now abandoned.

BACKGROUND OF THE INVENTION

The invention relates to a resilient support for receiving a force acting thereon along a certain direction, and wherein the force is opposed by a bearing counterforce acting at least partly along a direction opposite to the certain direction, and which includes a plurality of bar elements, at least two bar elements confronting one another, each of the two confronting bar elements having end regions, and forming rod pair means, linking bar means joining the confronting bar elements at a first set of connecting locations spaced at a distance from any end region of any of the confronting bar elements, two other bar elements, each connecting the end regions of the two confronting bar elements at a second set of connecting locations so as to form a closed structure therewith, the other bar elements forming bar pair means, at least two of the means being resilient in at least one of flexion and torsion, one force acting on a location of at least one of the other bar elements, the other force acting on the linking bar means, and at least one of the forces acting on a location of one of the bar means which is remote from the connecting location of the one of the bar means with the rod pair means.

It has already been proposed that the center points of a spring lever be fastened onto the end points of another spring lever supported in the middle, by which means a branched spring element is formed, which however involves the risk that in the case of point loading, the members fastened only at the center of the lever in the manner of a scale would, pivot around this middle point and hence yield to the loading.

From GB-PS 117126 (Hero) e.g. a spring element according to the general concept of claim 1 has become known. In this case the connecting bars located beneath a lattice of free and connected bars absorbing a force were of heavy construction, said connecting bars thereby absorbing the force applied to the lattice by elastic deformation or flection. Since due to their wavy form the connecting bars provided relatively soft springing action, the overlying lattice was relatively stiff, for which reason elastic blocks had to be arranged between said lattice and said connecting bars at the edge of this spring element. For this reason, the spring action of this known spring element was limited essentially to the connecting bars.

Another element according to the general concept of claim 1 has become known from U.S. Pat. Nos. 2,892,315 and 3,173,270 (Blancato). In this case a lattice as mentioned above is pushed upward along a sloping track, providing the spring action for a fender on a quay. The lattice itself is rigid.

Finally, a similar rigid lattice has also been proposed in FR-PS 2362308 (commissariat) which, however, in reality does not act as a spring, but as a damper. In this case the bars are of tubular construction which (unelastically) deform under mechanical stress.

It is therefore an object of the invention to devise a spring element or resilient support such that almost the entire structural height can be utilized for spring travel, and so that the spring characteristic can be adapted in a wide range to the respective requirements in spite of a low structural height, and that the entire structural height can be utilized for spring travel, even when forming spring devices made up of spring elements. In addition, the spring element, according to the present invention, has the object of countering a force to be absorbed by a support force which is as uniform as possible, regardless of whether the force is applied at individual points point-wise or is distributed over a larger surface.

SUMMARY OF THE INVENTION

The invention includes at least one closed series of segments made up of bars, of which at least two opposite, connected bars are joined together by a connecting bar at such points as are at a distance from the end of the connected bars, while one force acts at least on one free bar joining the end points of the two connected bars, the other force acting on the connecting bar, whereas at least one force acts at a point of the connecting bar or of the free bar which is located at a distance from the connection thereof with the connected bar, and by at least two members or pairs of members of the three members or member pairs, namely: A) connected bars, B) free bars and C) connecting bar, being of springing construction.

According to an especially expedient construction of the present invention, the two connected bars are of flexurally and/or torsionally elastic construction.

By "end points", here the end points of a connected bar relating to a series of segments is understood. As will be shown later, however, several series of segments can be joined together in the form of a ladder, whereas, for example, in individual construction configurations the connected bars extend continuously across several series of segments. In such a construction, the end point of a connected bar in a series of segments is then immediately adjacent to the end point of the connected bar in the adjoining series of segments, or even meets this end point.

BRIEF DESCRIPTION OF THE DRAWINGS

As an example, the invention is shown in the drawing in various configurations and described below, wherein

FIG. 7 shows in perspective view a spring device of rigidly mounted spring elements according to FIG. 2 arranged in series;

FIG. 8 shows in perspective view a spring device constructed of four spring elements according to FIG. 1;

FIG. 9 shows in perspective view a spring device similar to FIG. 8, constructed as a bedspring;

FIG. 10 shows a cross-section along line X—X in FIG. 9;

FIG. 11 shows a section similar to FIG. 10, but with merged bearing strips, and

FIG. 12 shows a cross-section of a bedspring variant.

FIG. 13 shows an end view of the spring element of FIG. 1.

DESCRIPTION OF THE PREFERRED EMBODIMENTS

Figure 1:
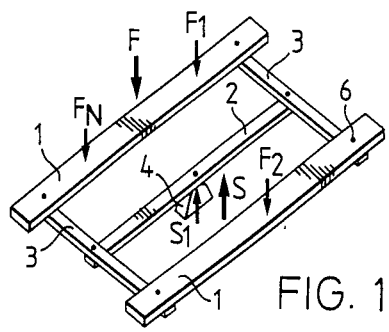
FIG. 1 shows in perspective view a spring e element representing a base element.

The spring element shown in FIG. 1 can be regarded as the base element because it has the smallest number of members possible using the spring elements according to the present invention.

As can be seen, it consists of a closed series of segments, in the case under consideration of a rectangle, the four sides of which are formed by rod pair means, such as two confronting free bars or bar elements 1 and bar pair means in the form of two opposed connected bars or bar elements 3 joined by linking bar means, such as a connecting bar 2. The spring element is supported on a support 4, at the middle of its connecting bar 2, which is acted on by a supporting force S. On the opposite side there acts the force F to be absorbed. On this movable force-acting side, any given number of force-applying points $F_1, F_2, \ldots F_N$ can be provided, at which corresponding forces are applied. Using FIG. 1 as an example, the free bars or bar elements 1 are thicker and hence of a less elastic construction than the connected bars or bar elements 3 and the connecting link bar 2; in the extreme case the free bars 1 can also be of rigid construction.

Figure 2:
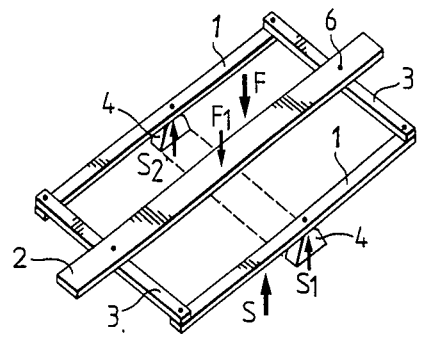
FIG. 2 shows in perspective view a further spring element representing a base element.

In FIG. 2 two supports 4 are provided, on which the two free bars 1, which are constructed thinner here than the connected bar 2, are supported. In place of the two supports 4, a single longitudinal support could also be used as is shown with dashed lines, and as will be described below using FIGS. 7 and 9.

The spring element according to the present invention functions as follows: when a force F is applied to the upper side of the element shown in FIG. 1, the connecting link or bar 2 is bent downward on both sides of its support in the middle. In this way the distance between its end points is shortened, the end points being joined to the center of the connected bars 3. The middle points of the connected bars 3 of elastic construction therefore follow the end points of the connecting bar 2 downward, but—relative to the spring element—toward the inside as well, while the end points of the connected bars 3 are fixed to the substantially less elastic or even rigid free bars 1. The connected bars 3 are therefore subjected to bending, as well as to torsion. The length an object placed, for example on the free bars 1 of the spring element, according to the present invention, can travel corresponds to the sums of the thicknesses of a free bar 1 and of a connected bar 3, namely until the base of the object not shown here located between the two free bars 1, which are assumed to be at the same height, rests on the upper side of the connecting bar 2.

The spring element, according to FIG. 2 functions in a similar manner, whereas with point loading of a force application point $F_1$ the spring travel corresponds not only to the sum of the thicknesses of a free bar 1 and a connected bar 3, but to the sum plus the height of the support 4.

In FIGS. 1 and 2 solid connections are shown using dots, the connections holding the parts of the spring element together. However, it is also possible, and for certain applications it can be expedient to arrange spacing elements such as those shown as 15, 16 and 17 (FIG. 13), between the members of the spring element, which themselves can be of solid or elastic construction (for example as rubber connecting elements). In the case of only slight torsion forces occuring, the forces can under certain circumstances be absorbed by the elastic rubber connecting elements, and a corresponding load is not transmitted to the connected bar 3. However, it is also possible for the connection of the spring element members, especially the connection between the connected bars 3 and the connecting bar 2, to be of movable construction, for example using a hinge or ball joint, whereby torsion forces can also be avoided, absorbed or transmitted.

Figure 3:
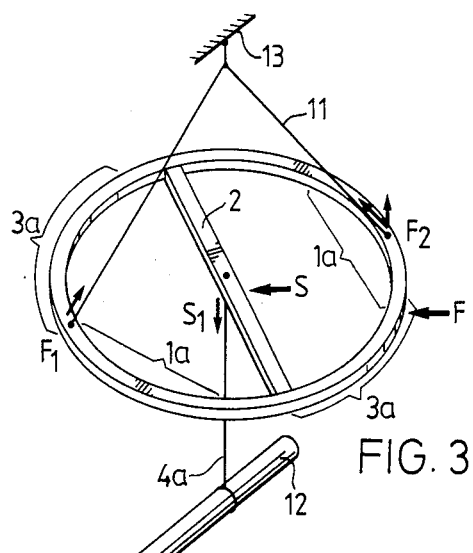
FIG. 3 shows in a perspective view a variant of the base element according to FIGS. 1 or 2, where the members of the spring element are in one layer.

With the spring elements according to FIGS. 1 and 2, the parts are located in three layers. As shown in FIG. 3, however, these parts can also be arranged in a single layer without changing the basic construction of the spring element. This applies regardless of whether a rectangular construction as shown in FIGS. 1 and 2 is selected, or whether a circular construction as shown in FIG. 3 is used. Any intermediate solution is naturally also possible, with which, for example, only the free bars 1 are in a level together with the connecting bar 2 (or bars), while the connected bars 3 are in another level (cf. FIG. 4). This permits the construction of bumpers, damping elements, for example for overhead lines and the like. The spring element according to FIG. 3 corresponds about to that of FIG. 1, and is marked with the respective reference symbols 1a, 3a and 4a. Here, the individual members shown by the braces merge, and correspondingly the two force-application sides S, F lie virtually in the same layer. Such a spring element can be used, for example, for the resilient suspension of a pipeline 12, in which case the spring element is fixed, for example to a ceiling 13 at force-application points $F_1$, $F_2$, for example by means of an elastic fork 11, while the pipeline 12 is suspended at force application point $S_1$.

Figure 4:
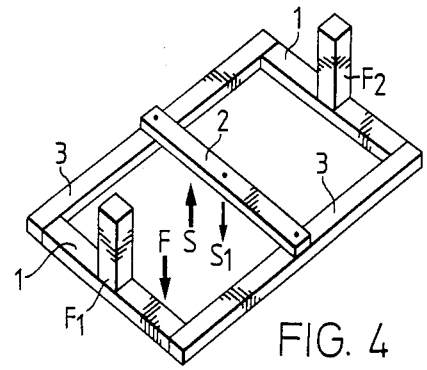
FIG. 4 shows a base element in perspective view, the members of which are arranged in two layers.

FIG. 4 shows the same spring elements as in FIG. 3, but the parts of the elements lie in two different layers. The one layer is formed by the free two bars 1a (with force application points at the supports $F_1$ and $F_2$) and the two connected bars 3a, while only the connecting bar 2 lies in the second layer.

Especially when—as mentioned above—the fixation of the connecting bar 2 at a point a distance away from the end points of the connected bar 3a, preferably in the middle, is of movable construction, the connected bars 3a can also be of less elastic or even rigid construction, if in addition the free bars 1a, as well as the connecting bar 2, are loaded so that they are flexurally elastic in the same manner, so that the middle points, as well as the end points of the connected bars 3a, drift inwardly approximately to the same extent.

Essential to the invention for construction of the spring element according to FIGS. 1 to 4 is, on the one hand, the arrangement of the bars to one another as set forth in the independent claim, and on the other hand the application of the force. Due to the different types of deformation in the case of a rigid connection the offset arrangement provides for the connected bars 3 to be torsioned and bent when the spring element is loaded. By means of dimensioning of the bars themselves, as well as by the arrangement or material selection thereof, the spring characteristic of such an element can be adapted in a wide range to the respective requirements.

Figure 5:
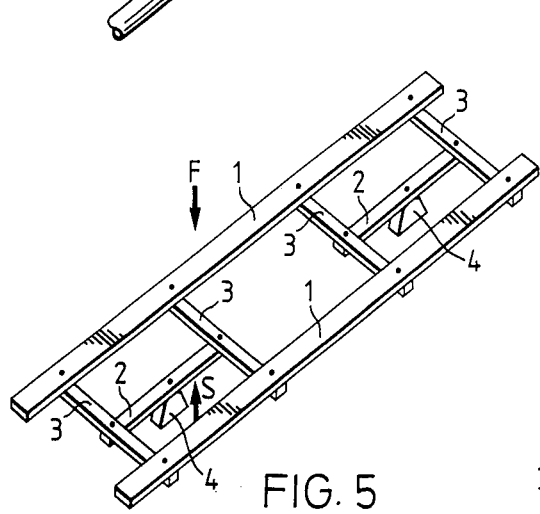
FIG. 5 shows in perspective view a spring device comprising two spring elements according to FIG. 1.

If several base elements are joined together, spring elements of any given size and shape can be formed. FIG. 5 shows such a spring device which includes two base elements according to FIG. 1; several closed series of segments 1, 3, 1, 3 are adjoined in a ladder-like manner, whereas two adjacent series of segments have one connected bar 3 in common, and the free bars 1 are continuous as the straight bars of a ladder. The two free bars 1 extending across the two base elements form a movable force application side F of a relatively large surface. Correspondingly, a much greater number of force-application points can be provided here. Relating to the special shape of the construction, it is noted that the lateral stability, namely diagonal to the members 1, is relatively low. Conversely, the longitudinal stability is high and high forces can therewith be absorbed. It is to be noted, however, that in function of the stability of the anchorage of the two supports 4 the spring element according to the present invention also has springing action diagonal to the free bars 1, in which case in the event of a force being applied in the plane of the spring element the connecting bar 2 is bent around its fixation point on the supports 4 in the plane of the spring element, or with a force being exerted diagonally from above it is additionally depressed downward and thereby torsioned The embodiment according to FIG. 5 also shows that the support 4 need not support the bar in the center. Here, the support 4 is located in the center of the connecting bar 2, but with regard to the length of the free bars 1, the supporting action is distributed to two out-of-center bearing points, as can also be the case with the embodiment according to FIG. 1 or 2 by the arrangement of two supports 4, for example each at ⅓ of the length of the connecting bar (FIG. 1) or the free bars 1 (FIG. 2). More than two bearing points can also naturally be arranged more or less uniformly over the length of the respective directly supported bar. In this context the distributions of the bearing points similar to FIG. 3 can also be seen in the FIGS. 6, 8, 10 and 11 described below.

Figure 6:
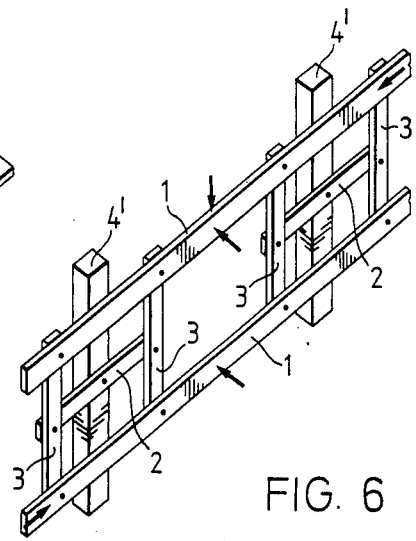
FIG. 6 shows in perspective view the spring device according to FIG. 5 in a configuration as a guardrail with elastic supporting members.

If with the spring device according to FIG. 5, the supports 4 are replaced by beams 4', and the beams used for mounting the spring device in the vertical position, the spring device according to FIG. 6 is obtained, which e.g. can be used as guardrail.

If several base elements according to FIG. 1 are arranged in series, a spring device according to FIG. 7 is obtained. Here, the support 4 forms a continuous supporting beam 4', on which several connecting bars 2 are arranged. With the example shown here the ladder stringers are hence formed by the connected bars or bar elements 3, while two adjoining series of segments have a free bar 1 is common. While the connecting bars or bar elements 2 only exhibit one force-application point $S_1$ each, any given number of force—application points $F_N$ can be provided on the free bars 1.

If the base elements according to FIG. 1 are arranged as per FIGS. 5 and 7, a spring device as per FIG. 8 is obtained. There, two base elements are arranged one behind another to a configuration as shown in FIG. 7. Two such constructions arranged one next to the other yield the spring device according to FIG. 8, whereas in addition to the connected bars or bar elements 3 the free bars 1 also extend continuously. Here, two successions of series of segments 1,3,1,3 are arranged ladder-like adjoining one another in a plane such that two adjacent ladder successions have a continuous connected bar 3 and a free bar 1 in common.

Such a spring device is shown as a bedspring for a mattress in FIG. 9, and the associated cross-section in FIG. 10. The spring construction according to FIG. 9 has two supports 4 configured as beams which are mounted on a support base 7. The connecting bars 2 and the free bars 1, with the connected bars 3 in between, are fastened on the supports 4. A frame 9 surrounding a mattress 10 is either mounted free on the support base 7 (FIGS. 10, 11), or connected to the connected bars 3 arranged at the edge of the free bars 1 with blocks 2' between the free bars 1 (FIG. 12).

The spring device according to FIG. 9 can be varied somewhat by the two middle connected bars 3 being merged to form a single bar as shown in FIG. 11. However, the remaining construction of the spring device is the same as shown in FIG. 10.

Many other spring devices are conceivable which can be deduced from the base elements and which are characterized by the movable force-application side forming a nearly uniformly springing, even surface, which with at least two rows of base elements arranged in parallel, exhibit an inherent lateral stability. Since with all configurations the members are offset to one another, one member cannot obstruct the spring travel of another member so that almost the entire structural height of the spring device is available to them for flexural travel.

The members of the spring element according to the present invention can be made of various materials, namely of plastic, wood or metal. They can also consist of profiles or flat, hollow members.

The application possibilities of the spring elements according to the present invention are almost unlimited. In addition to the applications as bedspring, guardrail and pipe support mentioned above, the spring devices can be used on quays to protect ships. It is also possible to spring-mount machines, even in the case of very high weights.

I claim:

1. A modular spring structure for receiving at least one force acting in a certain direction and at least one counterforce acting in an opposite direction,
   comprising,
   a single tier of latticed element, said latticed elements comprising,
   a first pair of elongate bars,
   a second pair of elongate bars, said second pair of elongate bars being connected at a first set of connecting locations to said first pair of elongate bars to form a closed modular structure,
   an elongate linking bar, said elongate linking bar being connected to said second pair of elongate bars at a second set of connecting locations, said second set of connecting locations being located remote from and between said first set of connecting locations, and
   support means in contact with and applying said counterforce to a localized region of said elongate linking bar, said force acting on one of said pairs of elongate bars,
   wherein
   said force produces a torque in a first direction at said first set of connecting locations, and said counterforce produces a torque in a direction opposite to said first direction at the second set of connecting locations,
   each of said second pair of elongate bars is resilient in and subjected to torsion and flexion upon application of said force and counterforce to said modular spring structure, said flexion occurring in the plane of said second pair of elongate bars and also in the plane perpendicular thereto, and each of said elongate bars in contact with said support means is resilient in and subjected to flexion.

2. The modular spring structure of claim 1 wherein said first set of connecting locations is located near the end regions of said first pair of elongate bars.

3. The modular spring structure of claim 1 wherein said first set of connecting locations is located near the end regions of said second pair of elongate bars.

4. The modular spring structure of claim 1 wherein said second set of connecting locations is located near the end regions of said elongate linking bar.

5. The modular spring structure of claim 1 wherein said second set of connecting locations is located near the central regions of said second pair of elongate bars.

6. The modular spring structure of claim 1 wherein said second set of connecting locations is located near the central regions of said second pair of elongate bars.

7. The modular spring structure of claim 1 wherein each of said elongate bars is resilient in flexion.

8. The modular spring structure of claim 1 wherein said first pair of elongate bars, said second pair of elongate bars, and said elongate linking bar are disposed at three respective superimposed levels.

9. A spring device comprising a plurality of the modular spring structures of claim 1, said modular spring structures sharing a common elongate bar.

10. The spring device of claim 9 wherein said common elongate bar comprises said first pair of elongate bars.

11. The spring device of claim 9 wherein said common elongate bar comprises said second pair of elongate bars.

12. The spring device of claim 9 wherein said common elongate bar comprises said elongate linking bar.

13. The spring device of claim 9 wherein said plurality of modular spring structures are disposed adjoining one another in a common plane.

14. The modular spring structure of claim 9 wherein said elongate bars are rigidly connected to each other.

15. The modular spring structure of claim 1 further comprising spacers disposed between said elongate bars.

16. The modular spring structure of claim 1 wherein said first pair of elongate bars, said second pair of elongate bars, and said elongate linking bar are disposed at two respective superimposed levels.

17. The modular spring element of claim 1 wherein said support means is in contact with and applies said counter-force to a localized region of one of said first pair of elongate bars, and wherein said force acts on said elongate linking bars.

18. A modular spring structure for receiving at least one force acting in a certain direction and at least one counterforce acting in an opposite direction, comprising a circular bar, said force being applied to said circular bar at a first set of locations, an elongate linking bar, said elongate linking bar being connected to said circular bar at a second set of diametrically opposed locations, said second set of locations being located remote from said first set of locations, and support means in contact with and applying said counterforce to a localized region of said elongate linking bar, said circular bar being resilient in and subject to torsion and flexion upon application of said force and counterforce.

19. The modular spring structure of claim 18, wherein said first set of locations comprises two diametrically opposed locations, said second set of locations is spaced by 90 degrees of arc from said first set of locations, and said counterforce is applied at the center of said elongate linking bar.

* * * * *